April 17, 1951          J. W. LEE          2,549,613

FREE CENTER FOR THE TAILSTOCK OF LATHES

Filed Aug. 30, 1948

INVENTOR.
JOHN W. LEE
BY
ATTORNEY

Patented Apr. 17, 1951

2,549,613

UNITED STATES PATENT OFFICE 2,549,613

FREE CENTER FOR THE TAILSTOCK OF A LATHE

John W. Lee, Dayton, Ohio

Application August 30, 1948, Serial No. 46,769

6 Claims. (Cl. 82—33)

This invention relates to a free center for the tail stock of a lathe or similar apparatus.

One object of the invention is to provide a free center of a construction which permits of the use of a large bearing without a corresponding increase in the over all dimensions of the center.

A further object of the invention is to provide a free center which will automatically take up wear on the bearing surfaces.

A further object of the invention is to provide a free center in which a portion of the inner surface of the shell forms the outer bearing surface for the main bearing.

A further object of the invention is to provide a free center having front and rear bearings of different sizes and in which the anti-friction elements of the two bearings are in axial alinement.

A further object of the invention is to provide a free center of such a character that the centering element and its bearings may be quickly and easily removed from the shell.

A further object of the invention is to provide a free center in which the point of the centering element may be ground under load and thus maintained in true axial alinement with its bearing.

Figure 1:
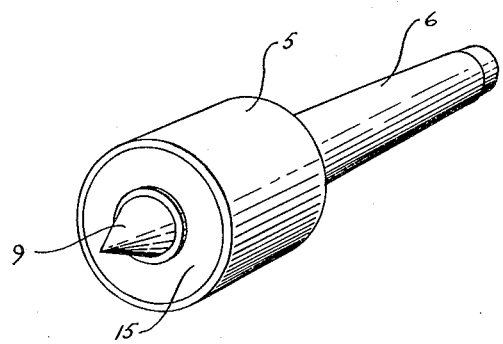
Figure 2:
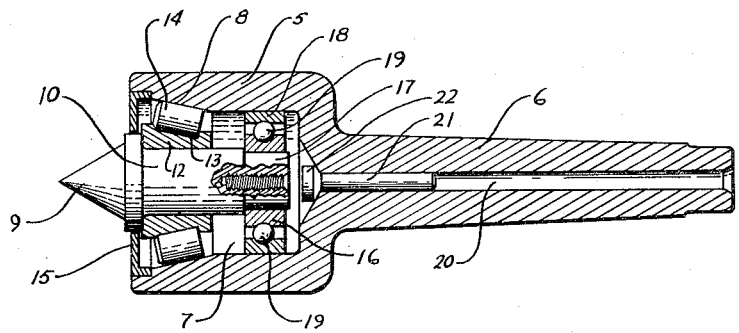
Figure 3:
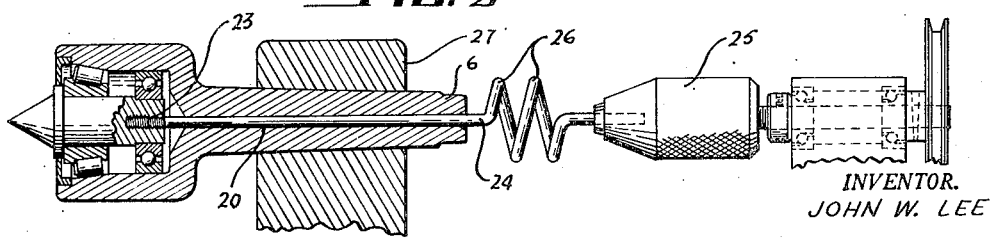

In the accompanying drawings Fig. 1 is a perspective view of a free center embodying the invention; Fig. 2 is a longitudinal sectional view of said free center; and Fig. 3 is a sectional view of the free center including a device for rotating the centering element under an artificial load.

In these drawings I have illustrated one embodiment of the invention and have shown the same as designed primarily for attachment to the tail stock of a lathe, but it is to be understood that the device may take various forms and may be used with mechanisms of various kinds.

In the embodiment here illustrated the free center comprises a cylindrical body or shell 5 preferably formed of steel and of a thickness sufficient to provide the necessary strength. The shell is provided with means whereby it may be attached to a support, such as the tail stock of a lathe, that means being here shown as comprising an elongate tapered shank 6 formed integral with the rear end wall of the shell. The shell is provided with a rearwardly tapered annular inner surface adapted to form the outer bearing surface of an antifriction bearing, as will be hereinafter described, and preferably the inner surface of the circumferential wall of the shell is flared forwardly to provide such a bearing surface. In the present arrangement the cavity within the shell comprises a cylindrical rear portion 7 and a flared forward portion 8 which constitutes the annular bearing surface.

The centering element comprises a conical forward end portion or point 9 and a substantially cylindrical inner portion or shank 10, these two parts being preferably separated by a circumferential extension or integral collar 11. The point projects forwardly beyond the shell and the shank extends into the shell and is supported therein by a bearing or bearings. For this purpose the shank is provided with a part having a bearing surface opposed to the tapered bearing surface of the shell and so arranged with relation thereto as to permit antifriction elements to be interposed between the two bearing surfaces. In the preferred construction a bearing member 12 is mounted on the shank of the centering element for rotation therewith and is preferably pressed thereon with a tight fit. The bearing member 12 has in the outer circumferential surface thereof a groove or race 13 of substantial width which is inclined rearwardly and downwardly and is here shown as parallel with the flared surface 8 of the shell. Interposed between the bearing member and the bearing surface of the shell is a series of antifriction rollers 14, which are held against axial movement with relation to the centering element by side walls of the race 13. Thus when the point is in supporting engagement with the work piece and the device is in operation the rearward thrust on the centering element tends to press the latter rearwardly and inasmuch as the bearing member 12 is in contact with the collar 11 the antifriction rollers are pressed firmly against the flared bearing surface 8, and as the bearing surfaces wear away the centering element and the bearing rollers move rearwardly to take up the wear on the bearing surfaces and thus maintain the rollers in firm running contact with the flared bearing surface with the point 9 in true axial alinement with the shell. This construction renders unnecessary the use of the usual outer bearing member or cup of an antifriction bearing, and enables a relatively large bearing to be used without increasing the diameter of the shell or decreasing the strength of the latter. Preferably the front end of the shell is closed by a cap 15 which is inserted in a circumferential recess in the forward end of the shell and has a central opening to receive the collar 11 of the centering element.

Preferably a second antifriction bearing, of smaller size than the main bearing, is interposed between the rear end portion of the centering element and the cylindrical rear wall of the cavity in the shell. In the arrangement shown this bearing comprises a ball race 16 pressed tightly on the rear end portion of the shank 10 of the centering element, which portion is preferably of a reduced diameter to provide a shoulder 17 with which the forward side of the ball race contacts. The outer ball race 18 of this rear bearing is mounted in the cylindrical portion of the cavity with a pressed fit and bearing balls 19 are mounted in the two races in the usual manner. Preferably the outer ball race 18 is pressed into the shell with a relatively light fit, sufficient to hold the same normally against axial movement, and thus retain the centering element and front bearing in the shell, but which will permit the bearing as a whole to move rearwardly with the centering element and main bearing when the latter are moved rearwardly by the thrust thereon to take up wear on the front bearing surface. The antifriction elements of the main bearing and the rear bearing are in axial alinement so that the two bearings function substantially in the manner of a single large bearing.

The supporting member or shank 6 for the shell is preferably provided with a small diameter axial bore 20 extending throughout the length thereof and opening into the cavity in the shell in alinement with the centering element. Movably mounted in the bore 20 is a plunger 21 which is here shown as having at its inner end a head 22 which is located within a recess in the end wall of the shell and arranged to be moved into engagement with the rear end of the centering element and actuated to release that element, and the parts carried thereby, from the shell, as by inserting a rod in the outer end portion of the bore 20 and striking the same against the inner end of the plunger.

The centering device is of such a character that the point of the centering element can be ground under load in its own bearing by holding the centering element under axial tension to retain the antifriction elements in contact with the flared bearing surface 8 and rotating the centering element in the shell, thus producing a point which will rotate perfectly true in its own bearings. This can be accomplished in various ways as by inserting a driving element through the bore 20 in the shank and connecting the same with the rear end of the centering element, the plunger 21 being first removed. The rear end of the centering element is provided with means whereby such an actuating member may be connected therewith, this means being here shown as a screw threaded socket 23. The driving element may be of any suitable character, and for the purpose of illustration it is here shown as a rod having a portion adapted to be inserted through the bore 20 and screw threaded into the socket 23. The outer end of the rod may be connected with a driving chuck 25 of any suitable character which is held against axial movement. An intermediate portion of the rod is provided with convolutions 26 constituting a spring which is placed under tension when the driving element is connected with the centering element and with the chuck and thus draws the bearing rollers into firm contact with the flared bearing surface of the shell and retains the same in such engagement while the rod is actuated to rotate the centering element in contact with a grinding element or the like. Consequently, there is no lateral displacement of the centering element during the grinding operation, such as would result if the latter had any lateral play in the shell, and the apex of the reground point will rotate in exact axial alinement with its bearings. During the regrinding operation the shell may be supported in any suitable manner as by mounting the shank 6 thereof in a suitable stationary fixture 27.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. A free center comprising a shell having means whereby it may be mounted on a support and having in the forward portion thereof a forwardly flared annular bearing surface, a centering element extending into said shell, a bearing member rigid with said centering element, antifriction elements between said bearing member and said flared bearing surface, a rear bearing for said centering element comprising a bearing member secured to said centering element for axial movement therewith, a bearing member mounted in said shell, spaced from the rear end thereof and held normally against axial movement to prevent the forward movement of said centering element but movable rearwardly by axial pressure on said centering element to compensate for wear on the flared surface of said shell, and antifriction elements between the two last mentioned bearing members.

2. In a free center a body having a cavity in the forward portion thereof, a centering element having a point and a part extending into said cavity, means including rearwardly and inwardly inclined annular bearing surfaces for rotatably supporting said centering element on said body, and means for rotating said centering element with relation to said body and for exerting rearward force thereon during said rotation, including a driving element rotatable in the rear portion of said body and drivingly connected with said centering element.

3. In a free center a body having a cavity in the forward portion thereof, a centering element having a point and a part extending into said cavity, means including rearwardly and inwardly inclined annular bearing surfaces for rotatably supporting said centering element on said body, said body having an opening through the rear portion thereof, and a driving device adapted to be rotatably supported in said opening and detachably connected with said centering element and including means for exerting a rearward force on said centering element during the rotation thereof.

4. A free center comprising a shell having the forward portion of its inner surface flared outwardly and constituting an annular bearing surface, a centering element extending into said shell, a bearing member on said centering element, antifriction elements between and in contact with said bearing member and said flared bearing surface, an antifriction bearing between the rear portion of said centering element and said shell, a supporting member extending rearwardly from said shell and having an axial bore in line with said centering element, and a driving element adapted to be inserted through said bore and drivingly connected with said centering element.

5. A free center comprising a shell having the forward portion of its inner surface flared outwardly and constituting an annular bearing surface, a centering element extending into said shell, a bearing member on said centering element, antifriction elements between and in contact with said bearing member and said flared bearing surface, said shell having an opening in the rear end thereof in line with said centering element, and said centering element having means whereby a driving element may be connected therewith, and a driving element having a part adapted to be inserted through said opening and connected with said centering element to rotate the latter and having means for yieldably retaining said antifriction elements in firm contact with said flared surface during the rotation of said centering element.

6. A free center comprising a shell having the forward portion of its inner surface flared outwardly and constituting an annular bearing surface, a centering element extending into said shell, a bearing member on said centering element, anti-friction elements between and in contact with said bearing member and said flared bearing surface, said shell having an opening in the rear end thereof in line with said centering element, and a driving device adapted to be inserted through said opening and drivingly connected with said centering element to rotate the same and including means for maintaining said anti-friction elements in firm contact with said bearing surfaces during said rotation.

JOHN W. LEE.

REFERENCES CITED

The following references are of record in the file of this patent:

UNITED STATES PATENTS

| Number | Name | Date |
| --- | --- | --- |
| 1,721,988 | Davis | July 23, 1929 |
| 1,750,079 | Wills | Mar. 11, 1930 |
| 2,077,293 | Weaver | Apr. 13, 1937 |
| 2,118,301 | Gegenheimer | May 24, 1938 |